United States Patent [19]

Schmidt et al.

[11] Patent Number: 5,066,690
[45] Date of Patent: Nov. 19, 1991

[54] COATING RESIN COMPOSITION BASED ON EPOXY POLYOL ESTERS OF UNSATURATED FATTY ACIDS

[75] Inventors: Roger A. Schmidt, Chanhassen; Bryan R. Swenson, Monticello, both of Minn.

[73] Assignee: Cargill, Incorporated, Minneapolis, Minn.

[21] Appl. No.: 547,372

[22] Filed: Jul. 3, 1990

Related U.S. Application Data

[63] Continuation of Ser. No. 324,193, Mar. 16, 1989, abandoned.

[51] Int. Cl.$^5$ .................. C09D 3/58; C08L 63/00
[52] U.S. Cl. ....................................... 523/423; 525/531
[58] Field of Search ..................... 523/423; 525/531

[56] References Cited

U.S. PATENT DOCUMENTS

| | | | |
|---|---|---|---|
| 3,247,136 | 4/1966 | Wynstra et al. | 523/423 |
| 4,151,131 | 4/1979 | Sekmakas et al. | 523/423 |
| 4,166,054 | 8/1979 | Meeske et al. | 523/423 |

FOREIGN PATENT DOCUMENTS 1550822 9/1975 United Kingdom .

Primary Examiner—John Kight, III
Assistant Examiner—Frederick Krass
Attorney, Agent, or Firm—Fitch, Even, Tabin & Flannery

[57] ABSTRACT

Epoxy polyol resins which are copolymerized with a blend of monomers having polymerizable double bonds are described as suitable water dispersible polymeric vehicles for coating compositions.

14 Claims, No Drawings

COATING RESIN COMPOSITION BASED ON EPOXY POLYOL ESTERS OF UNSATURATED FATTY ACIDS

This application is a continuation of application Ser. No. 324,193, filed Mar. 16, 1989 now abandoned.

This invention is directed to a water dispersible polymeric vehicle for use as a coating binder in coating compositions. More specifically this invention relates to a polymeric vehicle which comprises a reaction product of an epoxy polyol ester resin with unsaturated monomers which when neutralized with a base provides a water dispersible polymeric vehicle for use in coating compositions.

Environmental concern has become increasingly important in recent years. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Fire and health hazards of organic solvents also are well known. Governments may or have established regulations setting forth guidelines relating to volatile organic compounds (VOCs) which may be released to the atmosphere. The United States Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

Coating compositions such as enamels include epoxy resin esters as polymeric vehicles for coating binders. These epoxy resins usually require an organic solvent to reduce or disperse them. The present invention not only provides a water dispersible polymeric vehicle for an air dried coating, but also provides a resin which may be used as a polymeric vehicle for a coating binder for coatings such as enamels where the coatings have improved visual appearance, higher gloss, increased humidity resistance and improved adhesion. In an aqueous air drying coating composition, the polymeric vehicle of this invention when incorporated into a coating composition provides a coating composition with very good hydrolytic stability in aqueous solution and rapid drying capabilities. Moreover, the polymeric vehicle of the invention may be cross-linked with cross-linking agents in baked coating systems.

As used herein coating binder is the polymer portion of a coating film which has hardness, adhesion, humidity resistance, impact resistance and other measurable coating film properties. Pigments, solvents and additives may be mixed with the polymeric vehicle to provide a formulated coating composition. The formulated coating composition is that which is applied to a substrate and after baking and cross-linking or after any solvent, or diluent, such as water, is evaporated a coating film remains.

A resin which provides a water dispersible polymeric vehicle which is based on an epoxy ester is described in U.S. Pat. No. 4,166,054 to Meeske et al. The resin described in Meeske et al. is based solely upon an epoxy resin. It has been found, however, that coating compositions which comprise resins based solely upon an epoxy resin provide coatings with low gloss, gloss loss over time under high humidity and a proclivity to whiten during exposure to humidity.

A resin which provides a water dispersible polymeric resin based solely upon an epoxy ester resin or solely upon a polyol resin ester is described in U.K. 1,550,822. It has been found that coating compositions which comprise resins based solely upon polyol esters have relatively slow dry times and provide coatings with loose adhesion and corrode relatively rapidly in corrosive environments.

The invention provides a polymeric vehicle which after neutralization is a water dispersible polymeric vehicle for an aqueous formulated coating composition with very good hydrolytic stability and rapid drying characteristics. The polymeric vehicle of this invention provides a coating binder, which, when applied on a substrate, exhibits good adhesion to the substrate, high gloss, and moisture resistance.

The polymeric vehicle of the invention is the reaction product of from about 25 to about 90 parts by weight based upon the weight of solids of the polymeric vehicle of an epoxy polyol ester resin and from about 10 to about 75 parts by weight based upon the weight of solids of the polymeric vehicle of a blend of two or more unsaturated monomers having polymerizable double bonds such that the resulting polymeric vehicle has an acid value in the range of from about 15 to about 100, preferably about 40 to about 70, and most preferably about 60 to about 65. The epoxy polyol ester resin is a reaction product of from about 10 to about 65 parts by weight based upon the weight of solids of the epoxy polyol ester resin of an epoxy resin which has an average epoxy functionality of from about 1.8 to about 2.5 and an average epoxy equivalent weight in the range of from about 150 to about 800, from about 1 to about 30 parts by weight based upon the weight of solids of the epoxy polyol ester resin of a polyol having at least three hydroxyl groups and a molecular weight of at least about 120 and from about 25 to about 85 parts by weight based upon the weight of solids of the epoxy polyol ester resin of an unsaturated partially conjugated fatty acid having 16 to 20 carbon atoms having double bonds of which from about 20 to about 50% are conjugated. Preferably the partially conjugated fatty acid is a $C_{18}$ acid with from about 25 to about 30 percent conjugation. Generally these acids are used as a mixture of acids having 16 to 20 carbon atoms. A preferred epoxy resin which may be used in the invention is a reaction product of bisphenol A also known as 2,2 bis(4 hydroxy phenyl) dimethyl methane or bisphenol F also known as 2,2 bis (4 hydroxy phenyl) methane and epichlorohydrin having an epoxide equivalent weight of from about 150 to about 800 and preferably about 380. As will be discussed in further detail, the epoxy polyol ester resin is not just a blend of a polyol ester and epoxy ester resin, but rather, is a unique reaction product from the reaction of the epoxy resin, polyol and unsaturated partially conjugated fatty acid. As a result the method of making the epoxy polyol ester resin is important to the invention. Two methods to make the epoxy polyol ester resin are described herein one of which is an important alternative embodiment of the invention. In one method (hereinafter referred to as "method 1"), the epoxy resin starting material undergoes a catalyzed chain extension with bisphenol A, bisphenol F, aliphatic or cycloaliphatic diols or thirds to obtain the proper epoxy equivalent weight which step which also includes an addition of part of the unsaturated partially conjugated fatty acid for esterification. This reaction is carried out at a temperature range of from about 400° F. to about 475° F. When conjugated acid and chain extender such as bisphenol A are reacted with the epoxy resin starting material, the relative amounts of conjugated acid and bisphenol A used in the reaction are dependent upon one another. In total the equivalents of conjugated acid and bisphenol A should be sufficient to react with substantially all of the epoxy and hydroxyl groups available on the epoxy resin starting material. At minimum in method 1 an amount of conjugated acid is used to inhibit gelling of the epoxy polyol resin and facilitate processing thereof. The chain extension reaction is followed by further addition of the unsaturated partially conjugated fatty acid for esterification. This reaction is generally carried out at a temperature range of from about 400° F. to about 475° F. Suitable chain extension catalysts include triphenyl phosphine and aryl phosphonium halides. Suitable esterification catalysts include zirconium salts of an organic acid, dibutyl tin oxide, tetraisobutyl titanate, butyl stannoic acid and monobutyl phosphate. Method 1 is an important embodiment of the invention. In connection with method 1, epoxy equivalent weight ranges are a calculated value based upon equivalencies of reactants. In a second method of making the epoxy polyol ester resin (hereinafter referred to as "method 2"), the starting epoxy undergoes a catalyzed chain extension without the unsaturated partially conjugated fatty acid. In method 2 the partially conjugated fatty acid is added after the chain extension reaction.

After the epoxy polyol ester resin is made, the polymeric vehicle is obtained by reacting the epoxy polyol ester with a blend of unsaturated monomers at a temperature in the range of about 250° F. to about 350° F. Each of the monomers in the blend have double bonds which are polymerizable in a free radical reaction using free radical initiators such as dicumyl peroxide, tertiary butyl perbenzoate, ethyl-3,3-di(tertiary amyl peroxy) butyrate and cumene hydroperoxide. This blend comprises a first monomer which is an unsaturated monobasic acid with a polymerizable double bond and a second monomer which also has a polymerizable double bond. The monomer blend may contain monomers in addition to the first and second monomers. The double bonds of both monomers are polymerizable through a free radical mechanism. The amount of unsaturated acid monomer may vary, but sufficient unsaturated monobasic acid should be in the monomer blend to be in an effective amount to bring the acid value of the polymeric vehicle in the range of from about 15 to about 100. In a preferred form of the invention which includes an epoxy based upon bisphenol A and epichlorohydrin, at least about 8 parts by weight non acid second monomer based upon the weight of the solids in the polymeric vehicle will be required.

Suitable commercially available epoxy resins for use in this invention include: Araldite GY6010 which is an epoxy resin based on bisphenol A and epichlorohydrin and which has an epoxy equivalent weight in the range of from about 182 to about 192, Araldite PY307 which is an epoxy novalac resin based on bisphenol A and which has an epoxy functionality of 2.4, Araldite PY306 which is based on bisphenol F and which has an epoxy equivalent weight in the range of from about 159 to about 170, and XB4122 which is a flexible epoxy based on bisphenol A and which has an epoxy equivalent weight in the range of from about 333 to about 357 are available from Ciba-Geigy Chemical Company; DER-736 which is a flexible epoxy which has an epoxy equivalent weight in the range of from about 175 to about 205 from Dow Chemical Company and DRH-151 which is an aliphatic epoxy having an epoxy equivalent weight from about 232 to about 238 from Shell Chemical Company. Generally the starting epoxy resin material can have an average epoxy equivalent weight in the range of about 150 to about 400 prior to chain extension.

Polyols which are suitable for use in the invention have a molecular weight in the range of from about 120 to about 5,000, preferably from about 250 to about 2,000 and include RJ101, which is a styrene-allyl alcohol copolymer from Monsanto Chemical Company which has a hydroxyl content of about 7.7, an equivalent weight of about 220, a number average molecular weight of 1150 and a weight average molecular weight of about 1700; ditrimethylolpropane which has the formula

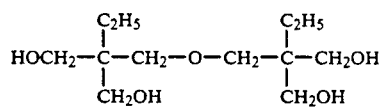

is commercially available from Perstorp Chemicals; dipentaerythritol which has the formula

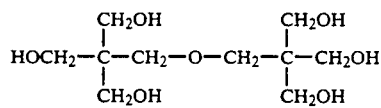

is commercially available from Hercules Chemical Company; neopentyl polyol which is an ester neopentyl polyol having an equivalent weight of about 50, functionality of 5 and a hydroxyl content by weight percent of 30% to 33% and is available from Pitman Moore Chemical under the designation XR101. Hul's Ketone-Aldehyde resins sold under the designations SK and BL 1201 may also be used as polyols, the SK polyol having the general formula

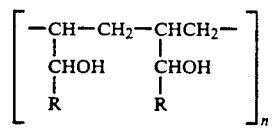

and the Bl 1201 polyol having the general formula

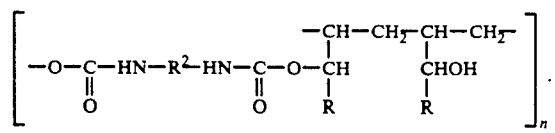

Suitable unsaturated partially conjugated fatty acids which may be used in the invention include dehydrated caster fatty acids, conjugated sunflower fatty acids and conjugated tall fatty acids. Pamolyn 327-B is an example of a commercially available $C_{18}$ unsaturated tall type fatty acid which is about 27% conjugated, from Hercules Chemical Company.

Suitable unsaturated monobasic acids for the monomer blend used in the invention include acrylic acid, methacrylic acid, maleic acid, and conjugated fatty acids. Any carboxylic acid with a double bond which is polymerizable through a free radical mechanism is believed appropriate as a functional component in the blend. Styrene, vinyl toluene, paramethyl styrene, N-vinyl pyrolidone, acrylonitrile and acrylic esters or any other monomer with a double bond which is polymerizable through a free radical mechanism with the other monomers including acid monomer and conjugated fatty acid are suitable as the second monomer in the monomer blend. Further, hydroxylalkyl acrylates and hydroxyalkyl methacrylates may be added to the blend to modify the polymeric vehicle, which then is neutralized, will be suitable for a thermosetting or baking cure system. As used in this context alkyl means an aliphatic group with four or less carbon atoms. This polymeric vehicle is cross-linked with a cross-linking resin such as an aminoplast resin. Cross-linking resins in such a system may include hexakis (methoxymethyl) melamine resin (HMMM).

A highly preferred embodiment of the invention includes the use of Araldite GY6010 which is chain extended with bisphenol A to an average epoxy equivalent weight of about 380. In this preferred embodiment the following ingredients are used in the preferred ranges shown:

| Reactant | Parts by Weight Based On Total Solids |
| --- | --- |
| GY 6010 | 16 to 20 |
| bisphenol A | 3 to 5 |
| Pamolyn 327-B | 31 to 35 |
| RJ 101 | 3 to 6 |
| Styrene | 26 to 30 |
| Acrylic acid | 8 to 11 |
| Free Radical Catalyst such as di-cumyl peroxide | 1 to 3 |

After the polymeric vehicle is made, it is neutralized with a base to make a neutralized water dispersible polymeric vehicle. The base can be a variety of amines such as triethylamine, dimethylaminoethanol and diisoproylamine. The base can also be ammonium hydroxide or ammonia.

The following examples are provided to illustrate the invention more fully; however, they should not be construed as limiting the scope of the invention, many variations of which are contemplated.

EXAMPLE 1

The following procedure describes method 1 for making the epoxy polyol ester resin of the invention using the following ingredients.

| Ingredients For Epoxy Polyol Ester Resin | Parts by Weight |
| --- | --- |
| (1) Araldite GY6010 | 27.34 |
| (2) Bisphenol A | 6.39 |
| (3) Triphenyl Phosphine | 0.02 |
| (4) Pamolyn 327-B | 25.62 |
| (5) Intercar Zirco 12% - Catalyst | 0.10 |
| (6) Xylene Reflux Solvent | 2.23 |
| | 61.73 |
| (7) Pamolyn 327-B | 25.22 |

| Ingredients For Epoxy Polyol Ester Resin | Parts by Weight |
| --- | --- |
| (8) RJ-101 | 6.74 |
| | 93.69 |
| Less reaction water | (1.46) |
| Less stripped xylene | (2.23) |
| | 90.00 |
| (9) Butyl Cellosolve (butoxyethanol) | 10.00 |

The Charge

GY6010 epoxy, bisphenol A, triphenyl phosphine catalyst, initial Pamolyn 327-B fatty acid, xylene and 12% Zirconium Intercar catalyst are charged into a 4-necked round bottom flask equipped with agitation, heat source, thermometer, nitrogen inlet, Dean-Stark trap and condenser. Initial fatty acid charge (see #4 above) in equivalents is equal to: oxirane equivalents of the GY6010 charge minus hydroxyl equivalents of the bisphenol A charge.

Epoxy Advancement/Esterification

The solution is heated to 450° F. maximum under xylene reflux and nitrogen sparge. When an acid number of 2 or less is attained, the remaining Pamolyn 327-B fatty acid (see #7 above) and RJ-101 are added to the solution. After the latter addition the resulting solution is heated to 450° F. maximum while removing reaction water. The reaction is continued until an acid number of 4 is attained. The reflux xylene is allowed to evolve off while the reactants attain an acid number of 3 or less; thereafter the reaction mixture is cooled to 300° F. while switching to nitrogen blanket and total condenser. The resulting epoxy polyol ester resin product is thinned with butoxyethanol. The epoxy polyol ester resin has the following characteristics:

| Gardner-Holdt Viscosity | Z4-Z5 |
| --- | --- |
| Viscosity, Stokes @ 25° C. | 63-98 |
| % Non-volatiles | 89.0-91.0 |
| Acid Number, Solids | about 3 |
| Gardner Color, Appearance | about 10, clear |

| Copolymerization With The Monomer Blend Ingredients For Polymer Vehicle | |
| --- | --- |
| Ingredients | Parts by Weight |
| (1) Epoxy Polyol Ester Resin | 46.15 |
| (2) Butyl Cellosolve (butoxyethanol) | 23.07 |
| (3) Styrene | 20.03 |
| (4) Acrylic Acid | 6.85 |
| (5) Di Cup-R (dicumyl peroxide) | 0.90 |
| (6) Di Cup-R Booster | 0.11 |
| (7) Di Cup-R Booster | 0.11 |
| (8) Butyl Cellosolve | 2.78 |
| | 100.00 |

The epoxy polyol ester resin is solubolized in Butyl Cellosolve and the solution temperature is stabilized within the range of 295° F. to 305° F. Premixed styrene, glacial acrylic acid and dicumyl peroxide (80% of total) are added continuously to the solution and at a constant rate over 3 hours. After monomer addition the mixture is heated for one hour and then dicumyl peroxide booster (10% of total) is charged into the reaction mixture. The reaction is heated for another hour and then the last dicumyl peroxide booster (10% of total) is added. The reaction is continued for another 1 ½ hours and then cooled to 160° F. After cooling the polymeric vehicle is filtered.

The resulting product has the following characteristics:

| | |
|---|---|
| Gardner-Holdt Viscosity | Z5–Z6+ |
| Viscosity, Stokes @ 25° C. | 100–200 |
| % Non-volatiles | 68.0–72.0 |
| Acid Number, Solids | 63.0–69.0 |
| Gardner Color, Appearance | about 8 |

EXAMPLE 2

The following procedure describes method 2 for making the epoxy polyol ester resin of the invention with the ingredients shown below.

| Ingredients For Epoxy Polyol Ester Resin | Parts by Weight |
|---|---|
| (1) Araldite GY6010 | 27.34 |
| (2) Bisphenol A | 6.39 |
| (3) Triphenyl Phosphine | 0.02 |
| (4) Pamolyn 327-B | 50.87 |
| (5) Intercar Zirco 12% | 0.10 |
| (6) Xylene Reflux Solvent | 2.23 |
| (7) RJ-101 | 6.74 |
| (8) Butyl Cellosolve | 10.00 |

The Charge

GY6010 epoxy, bisphenol A, triphenyl phosphine catalyst and xylene are charged into a 4-necked round-bottom flask equipped with agitation, heat source, thermometer, nitrogen inlet, Dean-Stark trap and condenser.

Epoxy Advancement

The solution is heated to 250° F., under nitrogen blanket. The exotherm is allowed to carry reaction temperature to 410° C.–420° F., and which is held for desired average epoxy equivalent weight which is about 380.

Esterification

The Pamolyn 327-B fatty acids, RJ-101 and 12% Zirconium Intercar are charged into the epoxy solution and the solution is upheated under xylene reflux and nitrogen sparge to 450° F. maximum while removing reaction water. The mixture is reacted to an acid number of 4. The reflux xylene is allowed to evolve off while reacting to an acid number of 3 or less. The reaction mixture is cooled to 300° F. while switching to nitrogen blanket and total condenser. The resulting epoxy polyol resin is thinned with butoxyethanol.

Copolymerization With The Monomer Blend

The epoxy polyol resin is reacted with a monomeric blend having the same ingredients in the same proportions under the same conditions as in Example 1 to provide a polymeric vehicle.

EXAMPLE 3

Using method 1 described in example 1 to make the epoxy polyol ester resin and polymeric vehicle, the following ingredients were reacted.

| Ingredients For Epoxy Polyol Ester Resin | Parts by Weight |
|---|---|
| Araldite GY6010 | 12.62 |
| Bisphenol A | 2.95 |
| Triphenyl Phosphine | 0.01 |
| Pamolyn 327-B | 23.48 |
| Intercar Zirco 12% | 0.05 |
| RJ-101 | 3.11 |
| Styrene | 20.03 |
| Acrylic Acid | 6.85 |
| Di-Cumyl Peroxide | 1.12 |
| Butoxyethanol | 30.46 |

The epoxy advancement reaction temperature was 452° F. and the copolymerization temperature was 300.

Several resins (denominated Resins R1 to R8) in addition to the polymeric vehicle of Example 3 were made for testing. The method of making the resin which is designated as Method 1 or Method 2, the ingredients and reaction conditions to obtain each resin are shown in Table I. After each resin was made, a water dispersible enamel was prepared and tested with the test results shown in Table II. Enamel film tests using the Resin of Example 3 and Resins R1-R8, the results of which are shown in Table II, were conducted on films which had been oxidatively cured at room temperature. The enamels were prepared using a sandmill and the following ingredients.

| Ingredient | Parts by Weight |
|---|---|
| Copolymer Resin | 98.6 |
| Butoxyethanol | 9.9 |
| sec-Butanol | 29.6 |
| Ammonium Hydroxide 28%, aqueous | 5.0 |
| Byk-301 (Byk-Chemie) Flow control additive. | 2.0 |
| Special Black 4 (Degussa Corp.) | 12.1 |
| Aerosil R972 (Degussa Corp.) Fumed Silica Extender Pigment | 2.0 |
| Copolymer Resin | 182.0 |
| Butoxyethanol | 9.9 |
| Activ-8 (R. T. Vanderbilt Company, Inc.) Activator for metal driers. | 1.0 |
| 5% Cobalt Hydro-Cure (Mooney Chemicals, Inc.) | 2.5 |
| Manganese Hydro-Cure II (Mooney Chemicals, Inc.) | 2.2 |
| Ammonium Hydroxide 28%, aqueous | 8.0 |
| Deionized Water | |

The procedure using the sandmill to make the enamels shown in Table II was as follows.

Sandmill Procedure For Making The Enamels Shown In Table II 1 98.6 g of resin was placed into a suitable container for milling.

2. The resin was neutralized with 5.0 g of ammonium hydroxide 28% with thorough stirring in of the ammonium hydroxide.

3. While agitating the resin ammonium hydroxide mixture 11.8 g. sec-butanol, 9.9 g butoxyethanol, and 2.0 g Byk-301 were added to the mixture.

4. The pigments Special Black 4A (12.1 g) and Aerosil R972 (2.0 g) were added and the agitation was increased.

5. Sand was added to the mixture until the desired consistency was achieved.

6. Sandmilling was continued until a grind of 7.0 national standard was achieved, then the material was added to the letdown.

7. The letdown was prepared with 182.0 g of resin neutralized by 8.0 g ammonium hydroxide 28%.

8. 14.8 g sec-butanol, 9.9 g butoxyethanol, 1.0 g Activ-8, 2.5 g 5% Cobalt Hydro-Cure, and 2.2 g Manganese Hydro-Cure II were combined and added to the resin ammonium hydroxide combination for the letdown.

9. After the millbase and letdown were thoroughly combined, deionized water 467.7 was stirred in.

10. Filter the paint to remove sand.

11. The pH was adjusted to 8.0–8.5 with ammonium hydroxide 28%, aqueous as needed.

Enamels made with the polymeric vehicles of the invention also may be made using other known procedures including those using a pebble mill.

EXAMPLE 4

A water reducible baking resin using the polymeric vehicle of Example 1 is made with the following ingredients.

| Ingredient | Parts By Weight |
|---|---|
| Resin of Example 1 | 84.78 |
| Melamine Resin | 11.15 |
| Butoxyethanol | 3.44 |
| Nacure 135 acid catalyst (a dinonylnaphthalene disulfonic acid catalyst) | .64 | after the blending of the resin of Example 1 with a cross-linking resin and catalyst as described above, the polymeric vehicle in the blend is neutralized and it is ground and blended with pigments and additives following the procedure in making the enamel described in Example 3.

| Ingredient For Baking Coating Composition | Parts By Weight |
|---|---|
| Blended Bakable Resin (with melamine) | 140.2 |
| Dimethylethanolamine | 10.5 |
| Titanium Dioxide Ti-Pure R-960 (DuPont) | 210.8 |
| Zinc Phosphate J0852 (Mineral Pigments Corp.) | 38.7 |
| Heliogen Blue L 6875 F (BASF) Wyandotte Corp. | 0.5 |
| Special Black 4 (Degussa Corp.) Pigment | 0.7 |
| Aerosil F972 (Degussa Corp.) Fumed Silica Extender Pigment | 4.0 |
| Patcote 577 (C. J. Patterson Co.) Antifoam Additive | 2.5 |
| Deionized Water | 225.0 |
| Blended Bakable Resin (with melamine) | 115.2 |
| Dimethylethanolamine | 5.0 |
| Patcote 577 (C. J. Patterson Co.) | 2.5 |
| Butoxyethoxyethanol | 4.9 |
| Butoxyethanol | 25.8 |
| Deionized Water | 231.9 |

THE TESTS

The enamels made from the Resin of Example 3 and R1 through R8 were drawn down on cold-rolled steel panels for testing as described below.

Dry times were determined on films drawn down on Lenata opacity charts. A Bird applicator was used to deposit a film that results in a 0.9–1.1 mil. thick film when dry. All other properties were determined on 0.8–1.0 mil. thick films on the cold-rolled steel panels. These were applied using a DeVilbiss spray gun and 50 psig. air pressure.

TABLE I

RESIN COMPOSITIONS and PROPERTIES

Resin Composition (Parts by Weight)

| Resin | Araldite GY 6010 | Bisphenol A | Triphenol Phosphine | Pamolyn 327B | Intercar Zirco 12% | Monsanto RJ-101 | Less Reaction Water | Styrene | Acrylic Acid | DiCumyl Peroxide (Refined) | Butoxyethanol |
|---|---|---|---|---|---|---|---|---|---|---|---|
| Ex. 3 | 12.62 | 2.95 | 0.01 | 23.48 | 0.05 | 3.11 | (0.68) | 20.03 | 6.85 | 1.12 | 30.46 |
| R1 | 11.91 | 2.78 | 0.01 | 24.16 | 0.05 | 4.90 | (0.81) | 18.95 | 6.57 | 1.07 | 30.41 |
| R2 | 12.83 | 3.00 | 0.01 | 23.82 | 0.05 | 3.11 | (0.73) | 20.03 | 6.85 | 1.12 | 29.91 |
| R3 | — | — | — | 24.60 | 0.07 | 24.49 | (1.52) | 14.12 | 5.29 | 0.86 | 32.09 |
| R4 | 14.89 | 3.48 | 0.01 | 24.02 | 0.05 | — | (0.63) | 20.16 | 6.89 | 1.13 | 30.00 |
| R5 | 12.64 | 2.95 | 0.01 | 23.51 | 0.02 | 3.12 | (0.72) | 20.03 | 6.85 | 1.12 | 30.46 |
| R6 | 14.45 | 0.94 | 0.01 | 23.22 | 0.04 | 3.08 | (0.20) | 20.03 | 6.85 | 1.12 | 30.46 |
| R7 | 12.20 | 3.42 | 0.01 | 23.57 | 0.05 | 3.12 | (0.83) | 20.03 | 6.85 | 1.12 | 30.46 |
| R8 | 15.95 | 3.73 | 0.01 | 29.67 | 0.06 | 3.93 | (0.85) | 9.95 | 6.85 | 0.70 | 30.00 |

| | Processing Conditions | | | Epoxy | Physical Properties | | | | |
|---|---|---|---|---|---|---|---|---|---|
| Resin | Extension Temp (°F.) | Method | Co-polymerization Temp (°F.) | Equivalent Wt. (Theoreti'l) | Viscosity (Gardner-Holdt) | Viscosity (Stokes) | Non-Volatiles % | Acid Value (Solids Basis) | Remarks |
| Ex. 3 | 452 | 1 | 300 | 380 | Z6+ | 190 | 68.6 | 66.9 | |
| R1 | 452 | 1 | 300 | 380 | Z5¼ | 116 | 69.5 | 61.5 | Physical Blend of Copolymers |
| R2 | — | — | 325 | — | | | | | |
| | 452 | 1 | 300 | 380 | Z6+ | 176 | 70.6 | 61.1 | Copolymer of Ester/ |

TABLE I-continued

RESIN COMPOSITIONS and PROPERTIES

|    |     |   |     |     |     |     |      |      |                           |
|----|-----|---|-----|-----|-----|-----|------|------|---------------------------|
|    | —   | — |     | —   |     |     |      |      | Polyol Blend              |
| R3 | —   | — | 325 | —   | Z6+ | 182 | 69.3 | 47.3 | Polyol Copolymer          |
| R4 | 452 | 1 | 300 | 380 | Z5  | 99  | 69.6 | 63.2 | Epoxy Ester Copolymer     |
| R5 | 414 | 2 | 315 | 380 | Z6+ | 210 | 71.6 | 59.5 | Ex. 3 Process Variation   |
| R6 | 408 | 2 | 290 | 225 | Z6− | 144 | 70.9 | 65.2 | Ex. 3 Lower Epoxy Equivalent Weight |
| R7 | 449 | 1 | 300 | 450 | Z5½ | 124 | 69.9 | 63.9 | Ex. 3 Higher Epoxy Equivalent Weight |
| R8 | 452 | 1 | 290 | 380 | Z4½ | 78  | 70.3 | 60.6 | Ex. 3 Higher Ester/Vinyl Ratio |

TABLE II

ENAMEL SOLUTIONS and FILM PROPERTIES
(Room Temperature, Oxidative Cure)

| Resin | Initial pH | Viscosity Initial (Krebs Units) | Δ pH 2 Wks @ 120° F. | Viscosity 2 Wks @ 120° F. (Krebs Units) | Dry Time Initial (Mins) | Dry Time 2 Wks @ 120° F. (Mins) | Visual Appearance | Gloss (60°/20°) | Pencil Hardness | Direct Impact (in-lbs) |
|---|---|---|---|---|---|---|---|---|---|---|
| Ex. 3 | 8.20 | 65 | −0.24 | −1  | 85   | 90   | Good   | 84/59 | F | 30  |
| R1    | 8.26 | 61 | −0.34 | 0   | 102  | 97   | Poor   | 88/68 | F | 25  |
| R2    | 8.15 | 63 | −0.12 | +2  | 110  | 104  | Poor+  | 88/61 | F | 25  |
| R3    | 8.23 | 62 | −0.20 | +9  | 465  | 308  | Good   | 92/85 | F | 35  |
| R4    | 8.24 | 62 | −0.28 | 0   | 147  | 146  | Poor   | 80/39 | F | 30  |
| R5    | 8.25 | 57 | −0.24 | −4  | 333  | 240  | Good   | 92/85 | F | 20  |
| R6    | 8.20 | 61 | −0.15 | −1  | 110  | 106  | Fair   | 71/29 | F | 30  |
| R7    | 8.25 | 64 | −0.17 | 0   | 124  | 132  | Poor−  | 85/55 | F | 20  |
| R8    | 8.20 | 64 | −0.34 | −10 | >480 | >480 | Good   | 85/54 | B | 140 |

| Resin | Crosshatch Adhesion | SALT FOG (72 Hours) Blistering | Scribe Creep (mm) | Adhesion Loss (%) | HUMIDITY (144 Hours) Gloss (60°/20°) | Crosshatch Adhesion | ΔL Value | Remarks |
|---|---|---|---|---|---|---|---|---|
| Ex. 3 | 5B | Med 6 | 1 | 5  | 5/19  | 5B | +0.9 |                                    |
| R1    | 5B | Med 6 | 1 | 5  | 11/33 | 5B | −0.3 | Physical Blend of Copolymers       |
| R2    | 5B | Den 6 | 3 | 5  | 44/56 | 5B | +2.8 | Copolymer of Ester/Polyol Blend    |
| R3    | 5B | Med 6 | 3 | 80 | 2/12  | 5B | +0.9 | Polyol Copolymer                   |
| R4    | 5B | Med 6 | 4 | 5  | 35/31 | 5B | +2.1 | Epoxy Ester Copolymer              |
| R5    | 5B | Med 6 | 1 | 5  | 9/34  | 5B | +3.4 | Ex. 3 Process Variation            |
| R6    | 5B | Med 6 | 3 | 40 | 60/30 | 5B | +9.9 | Ex. 3 Lower Epoxy Equivalent Weight |
| R7    | 5B | Med 6 | 1 | 5  | 31/42 | 5B | +2.3 | Ex. 3 Higher Epoxy Equivalent Weight |
| R8    | 5B | Few 6 | 3 | 40 | 3/9   | 5B | +0.1 | Ex. 3 Higher Ester/Vinyl Ratio     |

RESULTS AND DISCUSSION AS TO ENAMEL TESTS (A) RESIN VISCOSITY The Gardner-Holdt and the viscosity in Stokes were determined at 25.0° C. Viscosity and non-volatile are directly related.

(B) ENAMEL SOLUTION STABILITY Accelerated stability was tested at 120° F. to quickly obtain an approximation of what stability will be at ambient temperatures. The changes in pH and viscosity were measured and recorded to measure stability. In water soluble or dispersible oxidative cure ester type systems a drop of both pH and viscosity is normal. These changes are attributed to degradation of the polymer. While not intending to be bound by any theory, it is believed that hydrolysis reactions which generate additional carboxyl groups makes the system more acidic and lowers pH. Hydrolysis along with alcoholysis cleave the polymer into smaller molecules and this is generally the explanation for lower viscosity. Aside from Resins 3 and 8 the changes seen here are relatively small.

(C) DRY TIMES Dry times were determined using a Zapon tack tester using ASTM test D1640. Relatively small changes in dry times between initial and aged enamels is another indication of the good solution stability of these enamels.

(D) VISUAL APPEARANCE This test indicates the degree to which patterns appear in the coating film. The patterns that develop in these films are known as picture framing, orange peel, crawling, and cratering. The descriptions shown attempt to incorporate all these effects. Anything below a good rating would not be acceptable for most applications.

(E) SALT FOG The salt fog test was conducted by exposing the coated panel to a 5 percent sodium chloride vapor at a temperature of 95° F. for the stated time period. Before exposure a large X was scribed through a section of the coating to expose the substrate. A number of measurements are made after exposing the panel. "Scribe creep" is a measure of how far substrate corrosion has progressed under the paint film from a leg of the X, and is measured in millimeters. The higher the number the poorer the corrosion protection. The "adhesion" value is obtained by Scotch taping a leg of the X and estimating the percentage of coating that comes off of the taped area when the tape is removed. The ideal would be no film removal under these conditions.

The 5 percent removal reported for most resins is considered good. This amount could almost be accounted for by imperfections and/or dirt in the film.

(F) HUMIDITY Humidity resistance was tested by exposing the coated panel in a Cleveland condensation cabinet. The testing conditions were 100° F. and 100 percent relative humidity. See ASTM D2247-68 for further discussion of humidity testing.

Properties evaluated on the exposed panels are gloss, adhesion changes and degree of whitening. The changes in gloss shown in the table are all negative changes; the films lose gloss. There is no measurable loss of adhesion by our tests.

PROCESSING METHODS COMPARED

The advantages of method 1 can be seen by comparing resins of Example 3 and R5 in the Tables. There are only small differences in resin physical properties but important film performance advantages of the resin of Example 3 are much faster dry time, and much less gloss change and whitening ($\Delta L$ value) when exposed to humidity. The higher initial gloss of the film of Resin R5 likely relates to its slower dry.

EXAMPLE 3 PROVIDES A UNIQUE RESIN AS COMPARED TO EPOXY ONLY AND POLYOL ONLY RESINS

Resin R4 is an epoxy only type resin which was made like the resin of Example 3 with the polyol component omitted. The advantages of the resin of Example 3 are very evident in dry time, visual appearance (flow out on the substrate), gloss and gloss loss and whitening during humidity exposure and corrosion resistance.

Resin R3 is a polyol only type of resin which was made like the resin of Example 3 with the epoxy component omitted. The advantages of the Resin of Example 3 are seen in dry time and corrosion resistance.

THE RESINS OF THE INVENTION ARE SUPERIOR TO A BLEND OF EPOXY ONLY AND POLYOL ONLY RESINS

Resin R1 is a physical blend of Resins R4 and R3. The two resins are blended in a ratio that results in a composition that would be substantially analytically the same as that of the resin of Example 3. Because resin R1 is such a blend, Table I refers to an extension temperature in respect to the R4 portion of the blend. The dry time of an enamel of this blend is much faster than that of either of its components and nearly comparable to the dry of the enamel based on the resin of Example 3. However, the film of the resin blend has a hazy appearance and performs poorly in humidity. The hazy appearance is an indication of incompatibility between the two resins. The resin of Example 3 is a different polymer to provide a homogeneous resin.

Another way in which the components (R4 and R3) can be put together is to make the epoxy ester and the polyol ester separately and mix these in the proper ratio and then copolymerize the vinyl monomers with this mixture. This was done in Resin R2. An advantage of combining and processing the components in this manner over the physical blend discussed above is better homogeneity. The evidence for this is the absence of a milky appearance in R2. Many other film properties of R2, however, are poorer than those of a film from the physical blend. More importantly, when compared to the enamel based on Example 3, enamel performance of the latter is superior in dry time, visual appearance, corrosion resistance and humidity resistance.

EFFECT OF EPOXY EQUIVALENT WEIGHT

Resins R6 and R7 were made from intermediates having a lower and higher epoxy equivalent weights, respectively, than the intermediate for the Resin of Example 3. The satisfactory processing of these resins shows that intermediates with a rather broad EEW range can be used to make these copolymers. An analysis of the film proprieties of R6 and R7, however, shows that a narrow EEW range closer to that of the resin of Example 3is preferred.

Resin R6, which has a lower epoxy equivalent weight (EEW), has poorer film performance than a film based on the resin of Example 3 in all properties evaluated except adhesion.

The film deficiencies of the higher EEW Resins R7 are dry time, flow out, and humidity resistance.

ESTER/VINYL RATIO

Resin 8 evaluates the effect of increasing the ratio of ester component to vinyl component from 60/40 to 75/25. Again, the successful preparation of this resin shows that this ratio can vary over a wide range but film properties of the enamel show that it must be carefully balanced. The film properties that deteriorate badly at this ratio are dry time and corrosion resistance.

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A polymeric vehicle which is suitable for neutralization with a base to provide a water dispersible polymeric vehicle for a formulated coating, the polymeric vehicle comprising:

a reaction product of from about 25 to about 90 parts by weight based upon the weight of solids of the polymeric vehicle of an epoxy polyol ester resin and from about 10 to about 75 parts by weight based upon the weight of solids of the polymeric vehicle of a blend of two or more unsaturated monomers each monomer having polymerizable double bonds;

the epoxy polyol ester resin comprising a reaction product of from about 10 to about 65 parts by weight based upon the weight of solids of the epoxy polyol ester resin of an epoxy resin having an epoxy functionality of from about 1.8 to 2.5 and an average epoxy equivalent weight of from about 150 to about 800, from about 1 to about 30 parts by weight based upon the weight of solids of the epoxy polyol ester resin of a polyol having at least three hydroxy groups and a molecular weight of at least about 120, and from about 25 to about 85 parts by weight based upon the weight of solids of the epoxy polyol ester resin of an unsaturated partially conjugated fatty acid having from 16 to 20 carbon atoms having double bonds of which from about 20 to about 50 percent are conjugated, the epoxy resin, the polyol and the partially conjugated fatty acid ester being reacted together in a reaction mixture which includes all three reactants; and the blend of unsaturated monomers comprising an unsaturated monobasic acid and at least a second monomer, the unsaturated monobasic acid monomer being in effective amount to bring the acid value of the polymeric vehicle in the range of from about 15 to about 100.

2. A polymeric vehicle as recited in claim 1 wherein the epoxy resin is the reaction product of a first epoxy resin, a diol selected from the group consisting of bisphenol A, bisphenol F and mixtures thereof and a portion of the unsaturated partially conjugated fatty acid having from 16 to 20 carbon atoms which reaction brings the average epoxy equivalent weight of the epoxy resin in the range of from about 150 to about 800 and wherein the first epoxy resin has an epoxy equivalent weight in the range of from about 150 to about 400.

3. A polymeric vehicle as recited in claim 2 wherein the first epoxy resin is a reaction product of a diol selected from the group consisting of bisphenol A, bisphenol F and mixtures thereof and epichlorohydrin.

4. A polymeric vehicle as recited in claims 1, 2 or 3 wherein the polyol has a molecular weight in the range of from about 250 to about 2000.

5. A polymeric vehicle as recited in claim 4 wherein the epoxy resin has an average epoxy equivalent weight of about 380, the unsaturated partially conjugated fatty acid has 18 carbon atoms and from about 25 to about 30 percent conjugated double bonds and the blend of monomers comprise an unsaturated monobasic acid selected from the group consisting of acrylic acid, methacrylic acid, maleic acid and mixtures thereof and a second monomer selected from the group consisting of styrene, vinyl toluene, paramethyl styrene, N-vinyl pyrolidone, acrylonitrile and mixtures thereof.

6. A polymeric vehicle as in claim 2 wherein the first epoxy resin is the reaction product of bisphenol F.

7. A polymeric vehicle which is suitable for neutralization with a base to provide a water dispersible polymeric vehicle for a formulated coating, the polymeric vehicle comprising:
 a reaction product of an epoxy polyol ester resin and a blend of unsaturated monomers comprising styrene and acrylic acid, the ratio of epoxy polyol ester resin to monomer blending the range of from about 60/40 to about 75/25;
 the epoxy polyol ester resin comprising a reaction product of from about 16 to about 20 parts by weight based upon the weight of solids of the epoxy polyol ester resin of an epoxy resin having an epoxy functionality of about 1.8 to about 2.5, an average epoxy equivalent weight in the range of about 150 to about 800 and which epoxy resin is a reaction product of bisphenol A and epichlorohydrin, from about 3 to about 6 parts by weight based upon the weight of solids of the epoxy polyol ester resin of a polyol having a hydroxyl content in the range of about 3 to about 8, a molecular weight in the range of about 250 to about 2,000 and from about 31 to about 35 parts by weight based upon the weight of solids of the epoxy polyol ester resin of an unsaturated partially conjugated fatty acid having 18 carbon atoms and from about 25 to about 30 percent conjugation, the epoxy resin, the polyol and the partially conjugated fatty acid being reacted together in a reaction mixture which includes all three reactants; and
 the blend of unsaturated monomers comprising from about 26 to about 30 parts by weight based upon the weight of solids of the polymeric vehicle of styrene and from about 8 to about 11 parts by weight based upon the weight of solids of the polymeric vehicle of acrylic acid.

8. A polymeric vehicle as recited in claim 7 wherein the polyol is a styrene-allyl alcohol copolymer which has a hydroxy content of from about 7 to about 8 and wherein the epoxy has an average epoxy equivalent weight of about 380 and wherein the polymeric vehicle has an acid value in the range of from about 60 to about 65.

9. A polymeric vehicle as recited in claims 7 or 8 wherein the epoxy resin is the reaction product of a first epoxy resin, bisphenol A and a portion of the unsaturated partially conjugated fatty acid having from 16 to 20 carbon atoms which reaction brings the average epoxy equivalent weight of the epoxy resin in the range of from about 150 to about 800 and wherein the first epoxy resin has an average epoxy equivalent weight in the range of from about 150 to about 400.

10. A polymeric vehicle as recited in claim 9 wherein the polymeric vehicle has been neutralized with an amine or ammonia.

11. A formulated coating composition comprising a neutralized polymeric vehicle, the polymeric vehicle comprising:
 a reaction product of from about 25 to about 90 parts by weight based upon the weight of solids of the polymeric vehicle of an epoxy polyol ester resin and from about 10 to about 75 parts by weight based upon the weight of solids of the polymeric vehicle of a blend of two or more unsaturated monomers each monomer having polymerizable double bonds;
 the epoxy polyol ester resin comprising a reaction product of from about 10 to about 65 parts by weight based upon the weight of solids of the epoxy polyol ester resin of an epoxy resin having an epoxy functionality of from about 1.8 to 2.5 and an average epoxy equivalent weight of from about 150 to about 800, from about 1 to about 30 parts by weight based upon the weight of solids of the epoxy polyol ester resin of a polyol having at least three hydroxy groups and a molecular weight of at least about 120, and from about 25 to about 85 parts by weight based upon the weight of solids of the epoxy polyol ester resin of an unsaturated partially conjugated fatty acid having from 16 to 20 carbon atoms having double bonds of which from about 20 to about 50 percent are conjugated, the epoxy resin, the polyol and the partially conjugated fatty acid being reacted together in a reaction mixture which includes all three reactants; and
 the blend of unsaturated monomers comprising an unsaturated monobasic acid and at least a second monomer, the unsaturated monobasic acid monomer being in effective amount to bring the acid value of the polymeric vehicle in the range of from about 15 to about 100.

12. A formulated coating composition as recited in claim 11 wherein the epoxy resin is the reaction product of a first epoxy resin, a diol selected from the group consisting of bisphenol A, bisphenol F and mixtures thereof and a portion of the unsaturated partially conjugated fatty acid having from 16 to 20 carbon atoms which reaction brings the average epoxy equivalent weight of the epoxy resin in the range of from about 150 to about 800 and wherein the first epoxy resin has an average epoxy equivalent weight in the range of from about 150 to about 400.

13. A formulated coating as recited in claim 12 wherein the first epoxy resin is a reaction product of a diol selected from the group consisting of bisphenol A, bisphenol F and mixtures thereof and epichlorohydrin.

14. A formulate coating as recited in claims 11, 12 or 13 wherein the polyol has a molecular weight in the range of from about 250 to about 2000.

* * * * *

UNITED STATES PATENT AND TRADEMARK OFFICE
CERTIFICATE OF CORRECTION

PATENT NO. : 5,066,690
DATED : November 19, 1991
INVENTOR(S) : Roger A. Schmidt et al.

It is certified that error appears in the above-identified patent and that said Letters Patent is hereby corrected as shown below:

Column 2, line 68, delete "third" and insert --thiols--.

Column 4, line 53, change "Bl" to --BL--.

Column 5, line 43, change "abase" to --a base--.

Column 6, line 9, "(2.23)" should be underlined.

Column 6, line 10, delete the underlining under "90.00".

Column 6, line 64, insert a space between "305°F." and "Premixed".

Column 7, line 47, change "410°C.-420°F." to --410°F.-420°F.--.

Column 8, line 61, after "1" insert a period.

Column 9, line 40, change "after" to --After--.

Column 10, line 15, change "(BASF)" to --(BASF--.

UNITED STATES PATENT AND TRADEMARK OFFICE
CERTIFICATE OF CORRECTION

PATENT NO.   :   5,066,690
DATED        :   November 19, 1991
INVENTOR(S)  :   Roger A. Schmidt et al.

It is certified that error appears in the above-identified patent and that said Letters Patent is hereby corrected as shown below:

Column 14, line 4, insert a space between "3" and "is".

IN THE CLAIMS:

Claim 1, Column 14, line 45, after "1.8 to" insert --about--.

Claim 7, Column 15, line 35, change "blending" to --blend in--.

Claim 8, Column 15, line 66, change "hydroxy" to --hydroxyl--.

Claim 11, Column 16, line 29, after "1.8 to" insert --about--.

Signed and Sealed this

Third Day of August, 1993

Attest:

MICHAEL K. KIRK

Attesting Officer    Acting Commissioner of Patents and Trademarks